Patented Jan. 1, 1924.

1,479,695

UNITED STATES PATENT OFFICE.

FRIEDRICH BOEDECKER, OF BERLIN-TEMPELHOF, GERMANY.

PROCESS FOR THE PRODUCTION OF THERAPEUTICALLY-ACTIVE CONSTITUENTS OF OILS, BALSAMS, RESINS, AND EXTRACTS.

No Drawing.   Application filed March 23, 1923. Serial No. 627,189.

*To all whom it may concern:*

Be it known that I, FRIEDRICH BOEDECKER, a citizen of Prussia, in the German Republic, residing at Berlin-Tempelhof, Germany, have invented certain new and useful Improvements in Processes for the Production of Therapeutically-Active Constituents of Oils, Balsams, Resins, and Extracts, of which the following is a specification.

My invention relates to a new process of separating from oils, balsams, resins and extracts certain constituents thereof which are of therapeutical or medicinal value, by means of a cholic acid.

It is known in the art that apocholic acid and desoxycholic acid have a tendency to form, with organic substances of various kinds, well crystallized addition compounds and products of the kind have, already been utilized for therapeutical purposes.

Now, it has been found that the adding capability of the said two acids may be used for isolating from oils, resins, balsams and extracts therapeutically active and valuable constituents in the form of the aforesaid addition compounds, by treating the oil, resin, balsam or extract with the said acid or acids, and to thus obtain in a very simple and efficient manner valuable compounds which otherwise, that is to say in accordance with the heretofore practiced methods, could not be obtained except by way of complicated operations.

A particular advantage of my invention resides in the surprisingly simple manner in which the said constituents or compounds allow of being separated from the parent substance, although in many cases the latter includes only a very small percentage of such therapeutical or specifically valuable medicinal compounds. A further advantage of my invention lies in the fact that the obtainable valuable constituents or compounds are obtained from the said oils, balsams and the like in the form of fine crystallized preparations, and it is a still further advantage that in said preparations substances of unstable nature which otherwise are very liable to decomposition and change, can be isolated in an exceedingly stable form or state. If in a particular case my process is employed for or results in separating a plurality of compounds, the latter may, if desired, be separated from each other by way of fractional crystallization.

In case that it is desired to produce the therapeutically active substances or constituents of the oils, resins and the like in themselves, that is to say freed from the said cholic acid derivatives, this can be easily done by simply separating the addition compounds from the cholic acid in any known manner. The working operations in such a case depend upon the nature of the respective added substance. The latter may be separated or isolated e. g. by being driven off by means of steam or by being disengaged from the addition compound by means of a substance, such as e. g. xylol, having a greater affinity or adhering capability with relation to the apocholic acid or dioxycholic acid, whereupon isolation is brought about by a sucking off operation or by way of extraction with the aid of suitable solvents.

Cholic acid or its derivatives extracts from the oils, resins and the like, thereapeutically active substances or constituents of the oils and combines with the constituents to form a compound sufficiently stable for crystallization but sufficiently unstable whereby the extracted constituents of the oils may be readily separated from the compound by any of the above noted methods. When the cholic acid or any of its derivatives takes up the therapeutic constituents of the oils, it combines with the constituents and as such crystallizes out of solution.

If desired in lieu of free acids also compounds thereof with glacial acetic acid may be employed in carrying out my invention.

*Example 1.*—10 parts by weight of croton oil (constituent of the oil that is soluble in methylic alcohol) are added to a hot solution of 50 parts by weight of apocholic acid in 125 parts by weight of alcohol. On cooling the addition compound isolates from the solution or mixture by crystallization and is separated from the liquor and obtained in a pure state by further crystallization from a three and one half amount of alcohol. Melting point 188 to 190° C.

*Example 2.*—2.5 parts by weight of camomile oil (fraction 100 to 140° at 6 to 8 mm.) are added to a hot solution of 20 parts by weight of desoxycholic acid in 50 parts by weight of alcohol. Upon cooling and diluting the solution with a small amount of water the addition compound separates therefrom by crystallization. By repeated crystallizing operations with the aid of alcohol the little admixture of blue camomile oil can be easily removed and the compound thus will be obtained in the form of fine colourless crystals of prismatic shape. Melting point 178 to 180° C.

*Example 3.*—3.8 parts by weight of peppermint oil are added to a hot solution of 15 parts, by weight of apocholic acid in 45 parts by weight of alcohol. On evaporation in vacuo the addition compound readily separates from the solution by crystallization, whereupon the same is removed from the liquor, sucked off and washed out with ligroine. Melting point 156 to 158° C.

*Example 4.*—2 parts by weight of Peruvian balsam are added to a hot solution of 10 parts by weight of desoxycholic acid in 25 parts by weight of alcohol. On cooling the addition compound precipitates in the form of crystals which are purified by further crystallization from alcohol. Melting point 179 to 181° C.

Although I have herein described four examples embodying my invention, it is to be understood that various changes and modifications may be made therein without departing from the spirit of my invention and the spirit and scope of the appended claims.

What I claim is:

1. The herein described process of producing therapeutically active substances from oils, resins, balsams, and extracts which comprises extracting such therapeutic substances from the oils with a cholic acid to form with such acid and the therapeutically active substance, a crystallizable compound.

2. The herein described process of producing therapeutically active substances from oils, resins, balsams and extracts which comprises extracting such therapeutic substances from the oils with desoxycholic acid to form with such acid and the therapeutically active substance a crystallizable compound.

3. A process of producing therapeutically active substances from oils, resins, balsams and extracts which comprises treating the latter with a cholic acid to form with such acid and the therapeutically active substances a crystallizable compound, removing the compound thus formed from the solution and then separating the cholic acid from the therapeutically active substances.

In testimony whereof I affix my signature.

FRIEDRICH BOEDECKER.